United States Patent [19]

Herman

[11] 4,210,571

[45] Jul. 1, 1980

[54] SURFACTANTS AND THEIR USE AS COUPLING AGENTS IN THERMOSETTING POLYMERS

[75] Inventor: Daniel F. Herman, Princeton, N.J.

[73] Assignee: NL Industries, Inc., New York, N.Y.

[21] Appl. No.: 946,624

[22] Filed: Sep. 28, 1978

[51] Int. Cl.$^2$ .............................................. C08K 9/04
[52] U.S. Cl. ........................... 260/40 R; 260/37 EP; 260/37 N; 260/38; 260/39 R; 260/410.6
[58] Field of Search ............... 260/410.6, 40 R, 37 N, 260/37 EP, 38, 39 R

[56] References Cited

U.S. PATENT DOCUMENTS

| | | | |
|---|---|---|---|
| 2,269,529 | 1/1942 | Goldsmith | 260/410.6 X |
| 2,298,186 | 10/1942 | Woodhouse et al. | 260/410.6 X |
| 2,381,888 | 8/1945 | Agre | 260/410.6 X |
| 2,950,313 | 8/1960 | Kirkpatrick | 260/410.6 X |
| 3,160,679 | 12/1964 | Lew | 260/861 |
| 3,804,787 | 4/1974 | Nicks et al. | 260/40 R X |
| 3,887,515 | 6/1975 | Pennington et al. | 260/40 R |

*Primary Examiner*—Sandra M. Person

[57] ABSTRACT

Compounds useful as surfactant coupling agents in the preparation of filled thermosetting resin composites are provided which comprise vinyl carboxylic acid ester derivatives of compounds selected from the group consisting of polyoxyalkylene glycols, monoalkyl ethers of polyoxyalkylene glycols, monoalkyl phenyl ethers of polyoxyalkylene glycols, and polyoxyethylene derivatives of mono-, di-, and tri-hydroxy fatty acid esters of $C_1$ to $C_4$ mono- and polyhydric alcohols. The novel compounds are particularly useful in reducing the viscosity of highly bonded filler-prepolymer pastes to improve the dispersion of the filler and to promote interaction between the filler and the prepolymer so as to maintain and/or improve the properties of the final cured resin. The composites incorporating the coupling agents are useful in the manufacture of fiber glass reinforced sheet molding compounds (SMC) or bulk molding compounds (BMC), as well as in the production of laminating resins for use in spray-laminate operations.

25 Claims, No Drawings

SURFACTANTS AND THEIR USE AS COUPLING AGENTS IN THERMOSETTING POLYMERS

The present invention relates to surfactant coupling agents for the treatment of fillers employed in thermoset resins. Such coupling agents serve to reduce the viscosity of loaded filler-prepolymer pastes to improve the dispersion of the filler and to promote interaction between the filler and the prepolymer so as to maintain and/or improve the properties of the final cured resins.

In view of the recent shortages of petroleum feedstocks which are necessary to manufacture thermosetting resins such as polyesters, epoxies, polyurethanes, phenolics, ureaformaldehyde resins and melamines, and the expectation that such shortages will continue, there has arisen a need to incorporate larger volumes of inexpensive filler products into such polymers. The fillers function as extenders, and in certain cases, as reinforcing aids to improve the mechanical properties in which they are incorporated.

Coupling agents or adhesion promoters are often used in filled thermoset composites to aid in the incorporation of filler into the polymer and to form an adhesive bond therebetween. Such coupling agents become more essential as higher loadings of filler are incorporated into the resins. The problems of using fillers in thermoset applications and the need for suitable coupling agents to aid in such use results from the complex problem of reducing viscosities in the resin-filler blend to within processible limits and at the same time ensuring that the physical properties of the molded parts are not harmed and are in fact improved, particularly in the case where high loadings are involved.

The primary emphasis in the literature on coupling agents for fillers used in the preparation of thermosetting resin composites has been on silane and titanate based materials. Examples of silanes which have been employed as coupling agents include materials containing epoxy, amine, mercaptan, 3-chloropropyl, cationic styryl, phenyl and methacrylate functional groups. The organic titanates which have been used as coupling agents have included tristearyl titanate and titanium methacrylate derivatives thereof. However, the prior art silanes and titanates have been found to be minimally effective in reducing viscosity in the filler-prepolymer pastes and, in some cases, to detract from surfactant properties.

A new class of compounds useful as surfactant coupling agents in the preparation of filled thermosetting resin composites has now been found. The filled resin composites which incorporate the novel couplers surpass prior art systems in that they make possible the maximization of the benefits of special properties of certain fillers, e.g., aluminum trihydrate (ATH), the minimization of viscosity even at the high loadings which are desirably employed as a means of lowering costs, and the optimization of physical properties in the molded plastic itself. Such compounds comprise generally a vinyl carboxylic acid ester derivative of a compound selected from the group consisting of polyoxyalkylene glycols, mono alkyl phenyl ethers of polyoxyalkylene glycols, mono alkyl phenyl ethers of polyoxyalkylene glycols, and polyoxyethylene derivatives of mono-, di-, and tri-hydroxy fatty acid esters of $C_1$ to $C_4$ mono- and polyhydric alcohols. Preferably, the vinyl carboxylic acid from which the compounds are prepared will comprise a $C_3$ to $C_{11}$ acid and be selected from the group consisting of methacrylic acid, maleic acid, acrylic acid, crotonic acid, itaconic acid, and undecylenic acid.

In addition to the reductions in viscosity of the filled composites achieved when utilizing the novel compounds of the present invention as coupling agents, the presence of the vinyl group results in copolymerization and crosslinking with vinyl groups present in the thermosetting resins with which they are employed, e.g. styrene in a polyester resin formulation. Additionally, in a preferred embodiment of the present invention, when the coupling agent includes a half acid maleate group, i.e.:

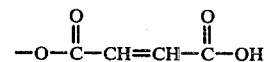

attached to the polyoxyethylene chain of the base compound through the ester linkage, the presence of the terminal carboxyl group aids in the absorption on the surface of the filler through an acid-base interaction, as well as enhancing the copolymerization effect of the vinyl group.

In the embodiment of the present invention, where the coupling agents comprise vinyl carboxylic acid ester derivatives of compounds selected from the group consisting of polyoxyalkylene glycols, monoalkyl ethers of polyoxyalkylene glycols, and monoalkyl phenyl ethers of polyoxyalkylene glycols, the base compound from which the ester is derived may comprise a polyoxyethylene glycol having from about 1–300 ethylene oxide (EO) units, and preferably from about 8–35 EO units, said EO units having the general formula:

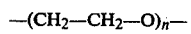

where n is from about 1–300 and preferably from about 8–35. Additionally, such coupling agents may comprise a polyoxypropylene glycol having from about 10–60- propylene oxide (PO) units, such propylene oxide units having the general formula:

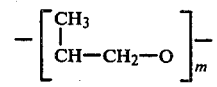

where m is from about 10–60. Still further, such coupling agents may comprise a block copolymer of a polyoxyethylene glycol having from about 2–300 EO units and polyoxypropylene glycol having from about 10–60 propylene oxide units, such compounds being represented by the following general formula:

where n is from about 1–150 and m is from about 10–60.

In the case where the base compound comprises a monoalkyl ether of a polyoxyalkylene glycol, specific examples of such compounds would include Tergitol 15-S-9 and Tergitol 15-S-40 manufactured by Union Carbide which comprise $C_{11}$ to $C_{14}$ linear alcohols, ethoxylated with approximately 9 and 40 moles of ethylene oxide, respectively. In the case where the base compound comprises a polyoxyethylene glycol, specific examples of such compounds would include diethylene glycol, Pluracol E 400, Pluracol E600, and Pluracol E1500, the latter three of which are manufactured by Wyandotte Chemicals Corp. and comprises polyethylene oxide having an average of 8, 12, and 33 ethylene oxide units respectively. An example of a base compound comprising a polyoxypropylene glycol in accordance with the present invention would include Pluronic 31RL manufactured by Wyandotte Chemicals Corp. which comprises polypropylene oxide having an average of 53 propylene oxide units therein. Examples of base compounds comprising block copolymers of a polyoxyethylene glycol and a polyoxypropylene glycol in accordance with the present invention would include Pluronic F108 and Pluronic L31, such compounds being represented by the general formula:

$$HO(EO)_n-(PO)_m-(EO)_nOH$$

where, in the case of Pluronic F108, n = 140 on the average and m = 56, and, in the case of Pluronic L31, n = 1.14 on the average and m = 16. Finally, in the case where the base compound comprises a monoalkyl phenyl ether of a polyoxyalkylene glycol, such base compound would be represented by the general formula:

$$RC_6H_4O(CH_2CH_2O)_nCH_2CH_2OH$$

where R is a $C_8$ or higher alkyl. A specific example of a base compound falling within this group would be Igepal $CO_850$ manufactured by GAF, in which R is a $C_9$ alkyl and n = 19 on the average.

In the further embodiment of the present invention, where the base compounds comprise polyoxyethylene derivatives of compounds selected from the group consisting of mono-, di-, and tri-hydroxy fatty acid esters of $C_1$ to $C_4$ mono or polyhydric alcohols, such compounds preferably comprise polyoxyethylene derivatives of mono-, di-, or tri-esters of ricinoleic acid, or hydroxy stearic acid and include an average of from about 1–100 ethylene oxide units, and preferably from about 30–75 ethylene oxide units per hydroxy group. Specific examples of such compounds include tri-esters of ricinoleic acid having an average of 1.7, 14.6 or 31 ethylene oxide units per chain. Such compounds are available from NL Industries, Inc. under the trade names Surfactol 318, Surfactol 365, and Surfactol 380 respectively. Still a further specific example of such compounds comprises the tri-ester of hydroxy stearic acid which includes an average of 71 ethylene oxide units on each hydroxy group. Such compound is also available from the NL Industries, Inc. under the trade name Surfactol 590.

The coupling agents of the present invention may be used with a variety of inorganic mineral fillers including silicas, metal silicates, metal oxides, hydrated aluminum oxides, antimony trioxide, calcium carbonate, and combinations thereof. Additionally, the thermosetting resins from which polymer-filler systems employing the coupling agents of the present invention are prepared may include polyesters, epoxies, polyurethanes, phenolics, ureaformaldehyde resins and melamines. Typically, the coupling agent will be present in an amount of from about 0.2–3% by weight of the filler, and preferably about 1 by weight of the filler, and may be included in the resin-filler blend in accordance with techniques known generally in the art. For example, the coupling agent may be coated onto the filler prior to incorporation of the filler into the resin, or may be employed by simply adding the coupling agent directly to the thermosetting resin followed by dispersion of the filler therein.

In a preferred embodiment of the present invention, the coupler compositions of the present invention are used to prepare resin-filler blends of polyester incorporating aluminum trihydrate (ATH) filler. ATH is well recognized as a low-cost flame retardant filler since it undergoes an endothermic release of water vapor at 230°–300° C. which will quench a flame and reduce smoke. The flame retardant effect increases at high loadings and it has been shown in the art that at 200 phr, molded parts will meet the Underwriter's Laboratory electrical and small-scale flame standards. Polyester pastes loaded at this level, however, have such excessive viscosities that they cannot be processed on an SMC machine. In this regard, however, high filler loadings are particularly desirable since they result in significant cost reductions. For example, ATH at 200 phr is additionally beneficial since the cured polyester is rendered flame retardant without requiring the usual expensive antimony oxide and halogenated polyester addition. As will be shown in the detailed examples hereinbelow, the filler-surfactant coupler combinations of the present invention, have resulted in 50% or more reduction in the paste viscosity so that processability and flame retardancy can both be achieved. This significantly improves the processing of the paste on an SMC machine and materially improves the wetting and dispersion of the reinforcing fiber glass by the paste.

Thus, the molded articles formed from the filler and glass loaded pastes prepared in accordance with the present invention can be used in automobile manufacture on hoods, trunk covers, panels and the like, as well as in boats, appliance housings and parts, and in housings and parts for electrical equipment and electronic instruments. Still other applications in the industrial area include tanks, pipes, dies, molds, and other plant equipment. Additionally, while the coupling agents of the present invention are particularly advantageous in highly filled systems, the viscosity reduction and coupling properties are also beneficial in polyester formulations which normally employ lower filler loadings. Examples of such formulations include spray laminate applications, fiber glass cloth-laminates, and fiber glass-polyester body solders. In such applications, increased filler loadings can be employed without harmfully affecting the rheology and flow properties of the loaded prepolymer.

The following examples are given to illustrate the present invention, but are not deemed to be limiting thereof. All percentages given are based upon weight unless otherwise indicated.

EXAMPLE A

When preparing half acid maleate derivatives of the Surfactols, maleic anhydride is reacted with the base compound in molten form on a 1:1 ratio of acid to hydroxyl equivalent in the base compound. An inert atmosphere, solventless system can be used and temperatures between 60° C. and 100° C. maintained for a .5–6 hour period. The reaction's progress is measured by acid number determinations and the reaction discontinued when an acid number drop of 33% to 50% of the initial value of the mixture is observed, indicating that from 66% to 100% of the original hydroxyl groups of the base compounds have been converted to the half acid maleate ester. A specific example of this technique would be as follows:

216.6g of Surfactol 590 is melted and 7g of maleic anhydride added thereto. The reactant mixture is maintained at 60° C. for a period of 3 hours and the product allowed to solidify. The acid number determinations during the 3-hour period are as follows:

Initial (theoretical): 35.83 mg KOH/g sample
1 hour of reaction: 22.67
2 hours of reaction: 21.36
3 hours of reaction: 21.88

EXAMPLE B

When preparing the esters of methacrylic acid, a similar technique to that described above is used in which methacrylic acid is reacted with the base compound, again in molten form, again on a 1:1 ratio of acid to hydroxyl equivalent in the base compound. A hydroquinone inhibited, toluene sulfonic acid catalyzed system can be used with an excess of toluene solvent to remove the water produced via azeotroping. The reaction is permitted to take place over a period of 5–10 hours including the eventual vacuum stripping of the solvent. The reaction can be monitored via the water produced and discontinued after 30% to 75% esterification is achieved. The acid number may be determined on the final product to determine the percent yield. A specific example of such technique utilizing Surfactol 380 as the base compound would be as follows:

56.1g of Surfactol 380 dissolved is dissolved in 60ml toluene with 0.2g of catalyst and 0.1g of inhibitor. After the mixture begins to reflux, 8.6g of methacrylic acid is added. The reaction is maintained at azeotroping temperature for 8 hours after which time the toluene is vacuum stripped from the mixture leaving a waxy ester behind.

EXAMPLE C

Where it is desired to produce either the maleate or methacrylate esters of the straight chain polyoxyethylene compounds (e.g. Pluracol E400), various mono- and di-ester can be prepared by reacting either maleic anhydride or methacrylic acid on a 1:1 molar ratio with the base compound. An inert nitrogen atmosphere is maintained and toluene solvent may or may not be used depending on whether the acid or anhydride is utilized. The reaction is allowed to proceed for 6 to 8 hours and the extent of reaction determined by a comparison of initial (theoretical) aid numbers with those of the final product. A 40% to 90% esterification is desired. A specific example of the foregoing technique utilizing Pluracol E400 as the base product is as follows:

100g of Pluracol E400 is mixed with 12.25g of maleic anhydride. The mixture is heated in an inert atmosphere until solution occurs. The mix is then maintained at slightly above 100° C. for 6 hours and the water of reaction is collected. The initial acid number is calculated at 62.5 and the final acid number observed as being 14.2 indicating an 80% esterification.

As will be appreciated by those skilled in the art, by varying the molar ratio of the acid to base compound during preparation of the vinyl carboxylic acid esters of the present invention, varying ratios of acid to hydroxyl equivalent in the final compound can be achieved. Additionally, various esterification techniques other than those specifically described above, can be utilized to prepare the novel coupling agents of the present invention and the foregoing description of particular techniques will be understood to have been by way of example only. Regardless, however, of the technique utilized in forming the coupler, or the particular ratio of acid to hydroxyl equivalent in the final product, the critical feature of the present invention is that at least one vinyl group be present to copolymerize with the thermosetting resin composition in which the novel coupling agent is being employed. Additionally, in the case where the vinyl carboxylic acid comprises maleic acid (although in practice maleic anhydride will be utilized as the reactant), it is preferred that only the half acid ester be prepared in order that a terminal carboxyl group will be present which, as previously noted, aids in the absorption of the coupler on the surface of the filler in the composites and enhances the copolymerization of the vinyl group with vinyl groups present in the thermosetting resin composition.

EXAMPLES 1–13

Evaluation of surfactant-coated fillers incorporated in polyester resin composites in accordance with the present invention, and a comparison with prior art couplers was accomplished using a Daniel flow-point test method as described in F. K. Daniel, National Paint Varnish & Lacquer Association, Scientific Circulars, 744 and 745, October, 1950. The method identifies two endpoints: "wet-out," i.e. when the filler particles clump together to form one homogenous mass; and "flow point," i.e. when the filler particles have sufficient lubrication to flow off the tip of a spatula with the last drop breaking as a thread of material which snaps back. The test gives an estimate of the homogeneity of the coating as well as the ease of lubrication of the particles. It correlates well with the viscosity of resin pastes, i.e. samples with low flow points usually yield low viscosity pastes. The test is performed by titrating a 5.0g portion of the filler in a Petri dish with a 25% concentration of resin U.S.S. Chemicals' GR13034) dissolved in styrene monomer. The solution is worked into the filler using a spatula and the volume of solution used to reach each endpoint is read directly from the buret.

The following full polyester formulation was used in preparing the pastes, prior to addition of fiber glass:

| Component | Manufacturer's Identification | phr |
| --- | --- | --- |
| isophthalate modified polyester resin | U.S.S. Chemicals' GR13034 | 60 |
| low profile additive | Union Carbide's Bakelite LP4A | 30 |
| styrene | — | 10 |
| zinc stearate | Penick's Zn stearate PM | 4 |
| filler (treated or untreated) | Alcoa's 331 ATH or Campbell's Camel-Wite | 140,175,200 |

Aluminum trihydrate (ATH) filler surfaces were coated with 1% of the coupling agent being tested (based on filler weight) by using a Twin Shell Blender. The uncoated filler was placed in the Blender cone and a 1% amount of coupler (prepared as an 8%–10% solution in solvent) added via the liquid-dispersion bar over a 5–15 minute period. After this initial application, the spinning of the dispersion (breaker) bar was discontinued and the cone allowed to rotate independently for a one-hour time span to promote uniform dispersion of the coupler. Following this, the coated filler was removed from the cone and dried in trays in a 75° C. forced-air oven for 16 hours to remove the solvent. After drying, soft agglomerates were broken by mild shearing action.

The polyester-filler combination was then prepared by dispersing the resin and low profile additive in a Cowles dispersator at low shear (20 volts) for 0.5 to 1.0 minute. The styrene was then added while mixing was in progress and after another 0.5 to 1.0 minute, the zinc stearate added as well. Following still another 0.5 to 1.0 minute, the filler was added in increments; each increment being allowed time for complete wet-out before addition of the next. As necessary, the voltage was increased in 5 volt intervals (up to a maximum of 45 volts) to permit better dispersion in the increasingly viscous medium. After all the filler had been added, the shearing was continued for an additional 5 minutes to insure complete uniformity. During this time, the paste temperature was maintained below 50° C.

As noted above, rather than coating of the filler with the coupler, it will be understood that the coupler may be pre-added to the polyester mix by dissolving 1-3% (based on filler weight) of the coupler in the styrene component of the polyester formulation and dispersing it simultaneously with the styrene prior to the incorporation of the filler. In Table I below are listed the "wet-out" and "flow points" for the various compounds tested as described hereinabove. The values given are in milliliters of a 25% polyester-75% styrene solution required by a 5 g sample of coated filler to reach the two endpoints. Each sample was tested a minimum of 3 times to obtain the average deviation. As shown in Table I, the ATH uncoated control gave values of 1.58 ±0.4 and 2.45 ±0.08 for wet-out and flow points respectively. The upper flow point number is more indicative of surfactant and coupling properties and the materials are rated numerically according to the following scale of values for flow point:

| RATING | FLOW POINT |
| --- | --- |
| 1. Highest efficiency | <2.00 |
| 2. Better than control | 2.00-2.20 |
| 3. Slightly better | 2.20-2.35 |
| 4. Equal to control | 2.35-2.55 |
| 5. Worse than control | >2.55 |

The data presented in Table I establishes that the prior art silanes and titanates (Examples 2-6) were minimally effective in reducing viscosity, and in some cases detracted from surfactant properties. With regard to the compounds of the present invention, all showed superior results in terms of reducing viscosity to that achieved with the prior art compounds, with the most significant improvement being observed in the case of the half acid maleate of Surfactol 590 (Example 7). Additionally, the presence of the vinyl group in all cases was observ ed to enhance coupling through polymerization with the polyester-styrene molding compound.

EXAMPLES 14-18

Table II below sets forth the results of additional tests conducted to determine the effectiveness of various couplers in accordance with the present invention utilized in connection with $CaCO_3$ fillers. The experimental procedures followed were identical in all respects to that described above with respect to Examples 1-13, the only difference being the substitution of filler.

Although the flow point values are in a different range than the values obtained using an ATH filler, the conclusions are basically the same regarding the usefulness of the above-described compounds as coupling agents in thermoset resin compositions.

EXAMPLES 19-25

Additional tests were conducted to determine the paste viscosity of SMC polyester formulations as described above utilizing both ATH and calcium carbonate fillers with and without a 1% or 2% coating of a coupling agent comprising Surfactol 590 Maleate as well as a 1% pre-addition. The samples prepared were allowed to equilibrate for one hour in a 28° C. constant temperature water bath. This interval also permitted some entrapped air to escape from the paste. Once equilibrated, the viscosity of the paste was measured using a Brookfield HBT equipped with #6 spindle and rotating at 20 rpm. The results at the various levels of filler tested are set forth in Table III with the corresponding percentage drops in viscosity being shown as well. As can readily be appreciated from the data in Table III, significant reductions in viscosity are achieved when utilizing either a coating or pre-addition Surfactol 590 Maleate over similar compounds where no coupler is utilized. In fact, at higher load levels more significant reductions in viscosity are found to exist.

Following paste formation, the resin was allowed to cure or thicken over a period of several days by ambient temperature aging in the presence of a curing agent in order to prepare the material for hot press molding. Magnesium hydroxide (e.g. Marinco H manufactured by Merck) or magnesium oxide is utilized to effect this cure and is added to the paste as the last ingredient to be incorporated in an amount of from about 2.5-5.0 phr. Table IV gives the viscosity data for curing of both ATH and $CaCO_3$ fillers using Surfactol 590 Maleate as the surfactant coupler. As can be seen from the data presented in Table IV, the coatings decreased the initial rate of cure but, nevertheless, result in desirable viscosities of 10 MM+cps after several days of storage. Such a viscosity-time profile is desirable, particularly where the stored pastes must be kept in inventory for some time prior to molding. Where it is desired to mold as soon as possible after paste manufacturing, this can be accomplished by employing higher levels of magnesium hydroxide, or more desirably, a hydroxide of higher activity.

The invention being thus described, it will be obvious that the same may be varied in many ways, such variations are not to be regarded as a departure from the spirit and scope of the invention, and all such modifications are intended to be within the scope of the following claims.

TABLE I

| | ATH TREATMENTS | | | |
| --- | --- | --- | --- | --- |
| Example | Compounds Tested | Wet Out | Flow Point | Effectiveness Rating |
| 1 | Control Alcoa 331 | 1.58 ± .04 | 2.45 ± .08 | 4 |
| 2 | Dow Z6076 - (chloropropyl) | 2.01 ± 0.5 | 3.22 ± .1 | 5 |
| 3 | Dow Z6032 - (cationic styryl) | 1.95 ± .11 | 2.98 ± .15 | 5 |
| 4 | Dow Z6030 - (methacryloxypropyl) | 1.52 ± .12 | 2.58 ± .10 | 5 |
| 5 | Union Carbide DSC-20 | 1.32 ± .02 | 2.22 ± .04 | 3 |

TABLE I-continued

ATH TREATMENTS

| Example | Compounds Tested | Wet Out | Flow Point | Effectiveness Rating |
|---|---|---|---|---|
| 6 | Dow A188 - (vinyl triacetoxy silane) | 1.46 ± .07 | 2.43 ± .09 | 4 |
| 7 | Surfactol 590 Maleate | 1.08 ± .02 | 1.59 ± .04 | 1 |
| 8 | Surfactol 590 Methacrylate | 1.22 ± .02 | 1.89 ± .01 | 1 |
| 9 | Diethylene glycol/Methacrylate (½)* | 1.37 ± .03 | 2.29 ± .08 | 3 |
| 10 | Plurocol E400 Methacrylate | 1.49 ± .02 | 2.32 ± .03 | 3 |
| 11 | Plurocol E400/Maleate (2/1)* | 1.26 ± .05 | 2.12 ± 0.7 | 2 |
| 12 | Plurocol E400/Maleate (½)* | 1.61 ± .07 | 2.21 ± .02 | 2-3 |
| 13 | Igepal C0850 Methacrylate | 1.33 ± .03 | 2.14 ± .03 | 2 |

*molar ratio of base compound to acid

TABLE II

CaCO₃ Treatments

| Example | CaCO₃ | COMPOUND TESTED | WET OUT | FLOW POINT |
|---|---|---|---|---|
| 14 | Camel-Wite (Campbell) | None | 1.29 ± 0.4 | 1.87 ± .02 |
| 15 | | Surfactol 590 - Methacrylate | 1.20 ± .01 | 1.82 ± .05 |
| 16 | | Surfactol 590 - Maleate | 1.05 ± .04 | 1.64 ± .03 |
| 17 | Hi-Pfil 300 (Chas. Pfizer) | None | 1.22 ± .03 | 1.87 ± .01 |
| 18 | | 2/1 Plurocol E400/Maleate | 1.15 ± .15 | 1.71 ± .24 |

TABLE III

VISCOSITY TESTS OF SMC POLYESTER FORMULATION

| | | Treatment | VISCOSITY | | |
|---|---|---|---|---|---|
| Ex. | Filler | Surfactant 590 Maleate | 140 phr | 175 phr | 200 phr |
| 19 | ATH-Alcoa 331 | None | 29,000 | 74,000 | 150–180,000 |
| 20 | ATH-Alcoa 331 | 1% Coating | 20,000 33%* | 33,000 45%* | 62,000 55–60%* |
| 21 | ATH-Alcoa 331 | 2% Coating | 16,000 | 37,000 | 66,800 |
| 22 | ATH-Alcoa 331 | 1% Pre-addition | 28,000 Minimal* | 60,000 20%* | 90,000 40%* |
| 23 | CaCo₃-Camel Wite | None | 22,000 | 38,400 | 70,800 |
| 24 | CaCo₃-Camel Wite | 1% Coating | 16,000 27%* | 30,400 21%* | 40,400 43%* |
| 25 | CaCo₃-Camel Wite | 1% Pre-addition | — | — | 47,200 33%* |

*% reduction in viscosity**

** $\frac{\Delta \text{Viscosity}}{\text{Viscosity of control}}$

TABLE IV

THICKENING EFFECTS OF MAGNESIUM HYDROXIDE

| | | Coating | | | Viscosity (cps) | | | |
|---|---|---|---|---|---|---|---|---|
| Example | Filler | (1%) | phr Filler | phr Mg(OH)₂* | 0 hr. | 1 hr. | 5 hr. | 1 Day |
| 26 | ATH | None | 200 | 3.0 | 92,000 | 125,000 | 880,000 | 22,000,000 |
| 27 | ATH | Surfactol 590-Maleate | 200 | 3.0 | 36,000 | 74,000 | 120,000 | 5,440,000 |
| 28 | ATH | Surfactol 590-Maleate | 200 | 4.5 | 56,000 | 84,000 | 160,000 | — |
| 29 | ATH | Surfactol 590-Maleate | 200 | 6.0 | 50,000 | 92,000 | 268,000 | — |
| 30 | ATH | Surfactol 590-Maleate | 140 | 3.0 | 16,000 | 23,200 | 38,000 | — |
| 31 | Camel Wite | None | 200 | 3.0 | 74,000 | 100,000 | 1,294,000 | 30,400,000 |
| 32 | Camel Wite | Surfactol 590-Maleate | 200 | 3.0 | 56,000 | 56,000 | 78,000 | 344,000 |

*Marinco H (Merck)

What is claimed is

1. A composition comprising a vinyl carboxylic acid ester derivative of a compound selected from the group consisting of a polyoxyethylene ether derivative of mono-, di-, and tri-hydroxy fatty acid esters of $C_1$ to $C_4$ mono- and polyhydric alcohols.

2. The composition of claim 1 wherein said vinyl carboxylic acid is a $C_3$ to $C_{11}$ acid.

3. The composition of claim 1 wherein said vinyl carboxylic acid is selected from the group consisting of methacrylic acid, maleic acid, acrylic acid, crotonic acid, itaconic acid, and undecylenic acid.

4. The composition of claim 3 wherein said vinyl carboxylic acid is methacrylic acid.

5. The composition of claim 3 wherein said vinyl carboxylic acid is maleic acid.

6. The composition of claim 1 wherein said hydroxy fatty acid comprises ricinoleic acid.

7. The composition of claim 1 wherein said hydroxy fatty acid comprises hydroxy stearic acid.

8. The composition of claim 1 wherein said polyoxyethylene glycol has an average of from about 1–100 ethylene oxide units.

9. The composition of claim 7 wherein said polyoxyethylene glycol has from about 8–35 ethylene oxide units.

10. The composition of claim 1 comprising a methacrylic acid ester of a tri-ester of hydroxy stearic acid having an average of about 71 ethylene oxide units per hydroxy group.

11. The composition of claim 1 comprising a maleic half acid ester of a tri-ester of hydroxy stearic acid having an average of about 71 ehtylene oxide units per hydroxy group.

12. A thermosetting resin composition comprising a thermosetting resin, a particulate inorganic mineral filler and a coupling agent present in an amount of from about 0.2 to 3% by weight of filler, said coupling agent comprising a polyoxyethylene ether derivative of mono-, di-, and tri-hydroxy fatty acid esters of $C_1$ to $C_4$ mono- and polyhydric alcohols.

13. The composition of claim 12 wherein said vinyl carboxylic acid is a $C_3$ to $C_{11}$ acid.

14. The composition of claim 12 wherein said vinyl carboxylic acid is selected from the group consisting of methacrylic acid, maleic acid, acrylic acid, crotonic acid, itaconic acid, and undecylenic acid.

15. The composition of claim 14 wherein said vinyl carboxylic acid is methacrylic acid.

16. The composition of claim 14 wherein said vinyl carboxylic acid is maleic acid.

17. The composition of claim 12 wherein said hydroxy fatty acid comprises ricinoleic acid.

18. The composition of claim 12 wherein said hydroxy fatty acid comprises hydroxy stearic acid.

19. The composition of claim 12 wherein said polyoxyethylene glycol has an average of from about 1–100 ethylene oxide units.

20. The composition of claim 12 wherein said coupling agent comprises methacrylic acid ester of a tri-ester of hydroxy stearic acid having an average of about 71 ethylene oxide units per hydroxy group.

21. The composition of claim 12 wherein said coupling agent comprises a maleic half acid ester of a tri-ester of hydroxy stearic acid having an average of about 71 ethylene oxide units per hydroxy group.

22. The composition of claim 12 wherein said inorganic mineral filler is selected from the group consisting of silicas, metal silicates, metal oxides, hydrated aluminum oxides, antimony trioxide, calcium carbonate and combinations thereof.

23. The composition of claim 22 wherein said coupling agent is present in an amount of about 1% by weight of said filler.

24. The composition of claim 12 wherein said thermosetting resin is selected from the group consisting of polyesters, epoxies, polyurethanes, phenolics, ureaformaldehyde resins and melamines.

25. The composition of claim 1 wherein the particulate filler is coated with the coupling agent.

* * * * *